United States Patent [19]
Hofste op Bruinink

[11] 4,001,886
[45] Jan. 4, 1977

[54] APPARATUS WITH HEADWHEEL SERVO FOR RECORDING AND PLAYING BACK VIDEO INFORMATION

[75] Inventor: Antonius Isidorus Hofste op Bruinink, Eindhoven, Netherlands

[73] Assignee: U.S. Philips Corporation, New York, N.Y.

[22] Filed: Jan. 7, 1975

[21] Appl. No.: 539,061

Related U.S. Application Data

[63] Continuation of Ser. No. 327,492, Jan. 29, 1973, abandoned.

[30] Foreign Application Priority Data

Feb. 8, 1972 Netherlands ............... 7201609

[52] U.S. Cl. .................. 360/75; 360/70; 318/314
[51] Int. Cl.² ............................. G11B 21/04
[58] Field of Search .............. 178/6.6 P, 6.6 A; 360/70, 73, 75; 318/318, 314

[56] References Cited

UNITED STATES PATENTS

| 2,944,108 | 7/1960 | Houghton | 360/73 |
| 3,017,462 | 1/1962 | Clark | 360/36 |
| 3,379,828 | 4/1968 | Smith | 360/70 |
| 3,520,993 | 7/1970 | Jacoby | 360/70 |
| 3,542,950 | 11/1970 | Luther | 360/70 |
| 3,729,583 | 4/1973 | Yano | 360/70 |

Primary Examiner—Raymond F. Cardillo, Jr.
Assistant Examiner—Alan Faber
Attorney, Agent, or Firm—Frank R. Trifari; Simon L. Cohen

[57] ABSTRACT

Apparatus for synchronizing the head wheel of a video tape recorder with the recorded signals uses a variable frequency oscillator controlled by the phase difference between recorded vertical synchronized signals and signals received from a vertical reference oscillator to provide a horizontal reference signal. The horizontal reference signal is compared with recorded horizontal synchronized signals as a fine control during playback.

6 Claims, 4 Drawing Figures

APPARATUS WITH HEADWHEEL SERVO FOR RECORDING AND PLAYING BACK VIDEO INFORMATION

This is a continuation of application Ser. No. 327,492, filed Jan. 29, 1973, now abandoned.

The invention relates to an apparatus for recording video information on, and playing it back from, a tape-shaped record carrier, which apparatus comprises a head wheel for recording and playing back the information and a control system for synchronizing the video information with a reference signal by controlling the speed of the head wheel. The control system includes a first detector for obtaining a first control signal by comparing a first measuring signal with a first component of the reference signal and a second detector for obtaining a second control signal by comparing a second measuring signal with a second component of reference signal. The frequency of the second component of the reference signal is considerably higher than that of the first component. The control system further includes a switching unit for applying an obtained control signal to a device for driving the head wheel. The switching unit selectively transmits the second control signal to the said driving device as soon as the first control signal has fallen below a given limit value.

Such an apparatus is described, for example, in "Journal of the SMPTE," July, 1961, pages 489 – 494. In particular in professional studio use such apparatuses are required to be very accurately synchronizable with respect to a reference signal in order to enable video information derived from different sources to be combined without perceptible transition phenomena.

This synchronization is effected by controlling the speed of the head wheel, for there is a unique relationship between this speed and the time-base of the signal recorded on the record carrier or read from this record carrier. This applies both to helical scanning in which, e.g., a single video head scans an oblique track on the tape and for transverse scanning in which in general a plurality of heads successively scan transverse track. In helical scanning in general a track contains one field of the video signal.

In the aforementioned known apparatus synchronization is affected in two steps, namely coarse control followed by fine control. During coarse control the control signal for the head wheel drive is mainly determined by the output signal from the first detector which performs a phase comparison between a field frequency first component of the reference signal and the first measuring signal. This first measuring signal is obtained by stripping the vertical synchronization signal from the video signal read or by means of a generator which is coupled with the head wheel and provides a signal the frequency of which is equal or proportional to the speed thereof.

By means of this coarse control the apparatus is first roughly synchronized with respect to the reference, whereupon fine control is applied during which the control signal for the head wheel drive is determined by the output signal from the second detector which performs a comparison in frequency and in phase between a line-frequency second component of the reference signal and the second measuring signal. During playback this measuring signal is obtained by stripping the horizontal synchronizing signal from the video signal read. Owing to the high frequencies of the second component of the reference signal applied to the second detector and of the second measuring signal a highly accurate control of the angular position of the head wheel is obtainable.

It has, however, been found that for correct synchronization the coarse control also has to satisfy stringent requirements, for it at the instant at which the control system switches from coarse control to fine control the deviation of the signal recorded on the record carrier and represented by the measuring signals from the reference signal exceeds one line period, the phase comparison performed during fine control will not be effected between corresponding line pulses of a field but between mutually shifted line pulses. This means that the error which exists during the change-over is maintained rounded off to an integral multiple of the line period. In order to avoid this error care must be taken to ensure that at the instant of change-over to the fine control the ultimate control error of the coarse control is smaller than one line period, which is a very exacting requirement.

It is an object of the invention to provide an apparatus of the type mentioned at the beginning of this specification in which the aforementioned difficulty is avoided. For this purpose, the invention is characterized in that the second component of the reference signal is generated by a variable oscillator to the control input of which a control signal is applied that is obtained by means of a third detector which compares a third measuring signal with the first component of the reference signal.

The step according to the invention ensures that the requirements to be satisfied by the accuracy of the coarse control can be appreciably less stringent than in the known apparatus, for when changing over from the coarse control to the fine control there is no objection to the residual error being several line periods, because such a deviation is detected by the third detector and is eliminated by adjustment of the frequency of oscillation of the variable oscillator. This ensures that in performing the fine control the correct line pulses are always compared without the coarse control having to satisfy stringent requirements.

A further advantage of the apparatus according to the invention consists in that during playback of the recorded video signal the first measuring signal may unobjectionably be supplied by a generator which is coupled to the head wheel and supplies a signal the frequency of which is proportional to the speed of the head wheel. This provides the advantage that the coarse control of the synchronizing process may be performed with the tape being stationary, i.e., without a signal being read.

This would be difficult in the known apparatus, for since ultimately synchronization of the video signal read from the tape with the reference signal is to be effected, accurate control also requires that the measuring signals should directly be derived from the signal read from the tape. A measuring signal derived from a generator coupled to the head wheel need not be accurately synchronous with a measuring signal strip from the signal read, for example the vertical synchronizing signal. Consequently, if in the known apparatus the first measuring signal were derived from such a generator, this would mean that after changing over to the fine control there might be a deviation between the first component of the reference signal and the corresponding signal in the video signal read, for example the vertical synchronizing signal which deviation might exceed one line period and would not be compensated for by the fine control.

In the apparatus according to the invention the said problem need not arise, because the third measuring signal may be derived from the video signal read from the tape. Consequently, an error due to a discrepancy between the measuring signal from the said generator and the corresponding time base of the video signal recorded on the tape will be eliminated by adjustment of the variable oscillator.

In order to compensate for a phase error due to a preferably employed method of phase measurement, an embodiment of the apparatus according to the invention is characterized in that a delay element is provided via which the first component of the reference signal is applied to the third detector.

Embodiments of the invention will now be described, by way of example, with reference to the accompanying diagrammatic drawings, in which.

Figure 3:
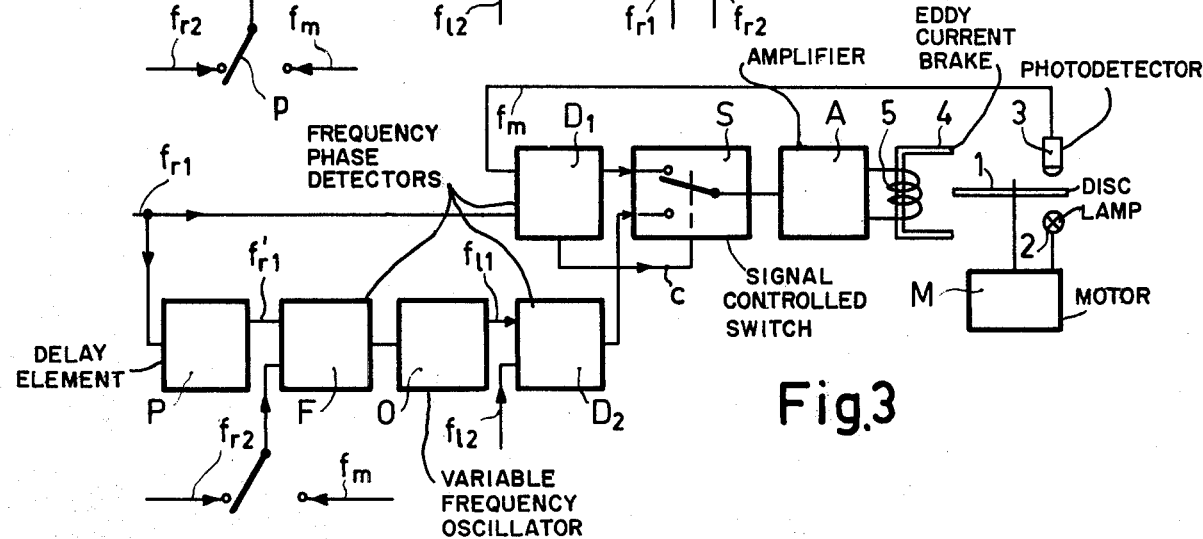
FIG. 3 shows a second embodiment thereof.
Figure 4:
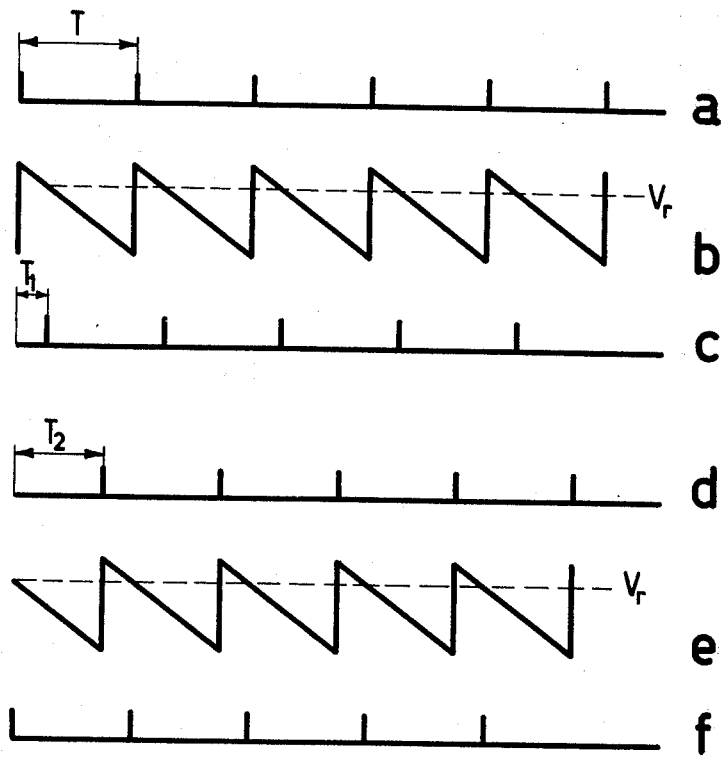

FIG. 4 consisting of 4a through 4f, shows voltage waveforms illustrating the embodiment shown in FIG. 3.

Figure 1:
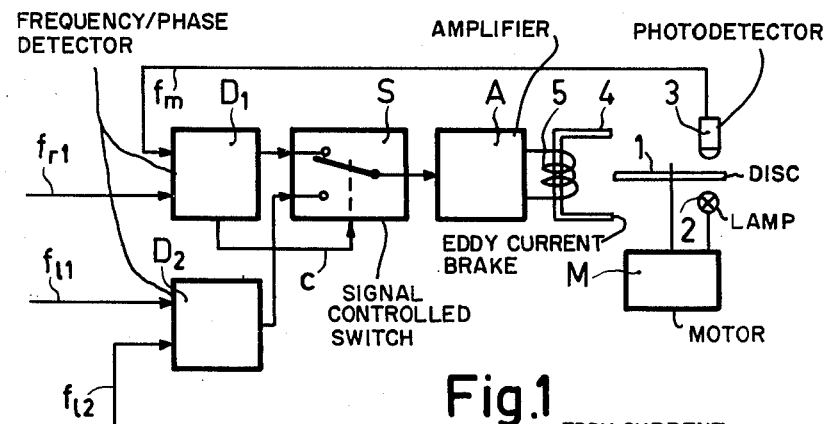
FIG. 1 shows the known apparatus.

Referring now to FIG. 1, which shows only the elements essential for synchronization, the known apparatus depicted includes as a first element a motor M which drives the head wheel. For measuring the speed of this head wheel turning recording, the motor shaft carries a disc 1 which, for example, may be provided with a hole at its circumference. Thus, a lamp 2 and a photodetector 3 together with the disc 1 enable a measuring signal $f_m$ to be obtained the frequency of which is a measure of the speed of the head wheel. This measuring signal $f_m$ is applied to a first detector $D_1$ to which is also applied the field frequency reference signal $f_{r2}$ from the same reference oscillator (not shown) that synchronizes all the studio video equipment. The detector $D_1$ determines the difference in frequency and in phase between the said signals and applies to corresponding output signal via a switch S and an amplifier A to a control input of the device for driving the head wheel. In the embodiment shown this control input comprises the terminals of a coil 5 mounted on an armature 4. This armature 4 together with the disc 1 forms an eddy-current brake. In this arrangement it is assumed that the motor M normally has a speed higher than the synchronized speed and is braked to the correct speed by the eddy-current brake. Obviously, as an alternative, the motor energization may be controlled.

During play-back the speed of the head wheel is adjusted by means of this coarse control loop until synchronization of the field-frequency reference pulse train $f_{r1}$ and the pulse train $f_m$ is achieved. As soon as the phase difference between these signals falls below a given threshold value, the coarse control is switched off and the fine control is switched on by means of a control instruction applied to a switch S via a line c. The switch S then establishes a connection between the output of a second detector $D_2$ and an amplifier A. To this second detector $D_2$ are applied a line-frequency reference signal $f_{l1}$ from a second reference oscillator (not shown) that is used to horizontally synchronize all the studio video equipment and the horizontal synchronization signal $f_{l2}$ read from the record carrier or tape, the difference in frequency and in phase between these signals being again determined by this detector. This provides highly accurate control, because now the measuring frequency is high, i.e. 15,625 Hz.

Figure 2:
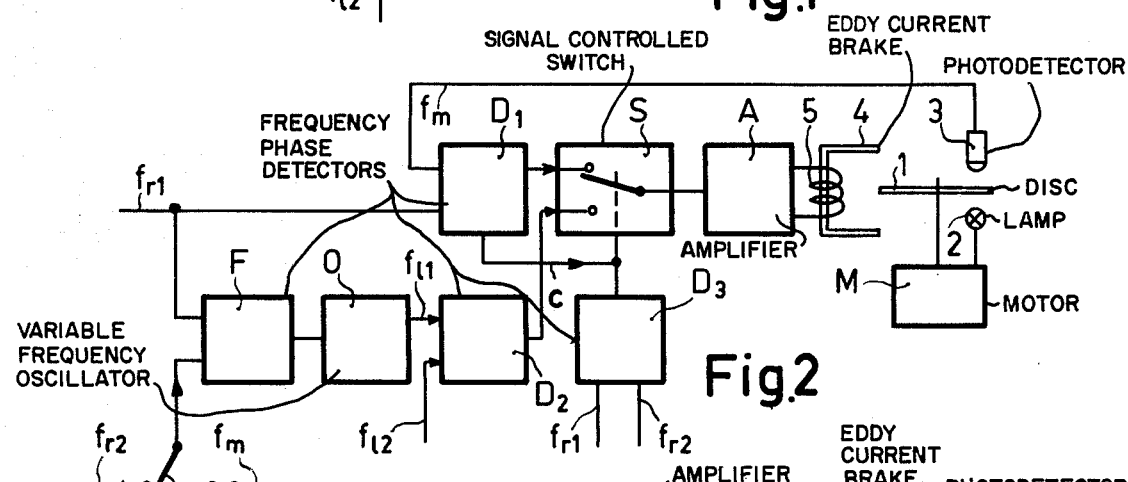
FIG. 2 shows a first embodiment of the apparatus according to the invention.

When changing over from coarse control to fine control the residual phase error may still comprise several line spacings, which means that the fine control synchronizes wrong line pulses with one another. This defect is simply avoided in the apparatus according to the invention shown in FIG. 2, in which corresponding elements are designated by like reference symbols. In this apparatus the line-frequency reference signal $f_{l1}$ is produced by a variable frequency oscillator O which receives an adjusting signal from a phase comparison circuit F to one input of which the field-frequency reference signal $f_{r1}$ is applied and to the other input of which during display the vertical synchronization signal $f_{r2}$ read out during playback. During recording the pulse train $f_m$ is applied via a switch P. This ensures that any phase difference between the said field frequency reference signal and the vertical synchronization signal read from the tape which may be left even after the fine control has been switched on is eliminated in that the oscillation frequency of the oscillator O is varied in a compensating sense. This method of fine control ensures that ultimately the detector $D_2$ compares the correct line pulses with one another.

As is shown, both during recording and during playback the first measuring signal may be constituted by the signal $f_m$ from the photo-detector 3, for after the change-over to fine control during play-back a comparison is made between the vertical synchronization signal $f_{r2}$ read out and the reference pulse train $f_{r1}$. Obviously, during recording instead of the vertical synchronization signal $f_{r2}$ the measuring signal $f_m$ is applied to the detector F. The measuring signal $f_{l2}$ for the detector $D_2$ also is derived from the head wheel in the same manner as the signal $f_m$. This measuring signal need not be at the line frequency, but there is no objection to its being a sub-multiple of the line frequency. It is true that the accuracy will then be reduced, however, this is not greatly objectionable during recording.

Instead of deriving the control signal for the switch S from the detector $D_1$ via the line c a suitable control signal may be derived from an additional detector $D_3$ which measures the phase difference between the reference pulse train $f_{r1}$ and the vertical synchronization signal $f_{r2}$ read out.

FIG. 3 shows an embodiment which enables a simple method of phase measurement to be employed which, however, normally introduces an error, as will be explained with reference to FIG. 4.

FIG. 4a shows the field frequency reference signal $f_{r1}$ in the form of a pulse train having a pulse spacing T. A simple method of phase measurement consists in that this pulse train is converted into a sawtooth signal as shown in FIG. 4b. By measuring the value of this sawtooth signal at instants which correspond to the pulses of the frame pulse train $f_{r2}$ read out, which pulse train is shown in FIG. 4c, a signal which corresponds to the phase difference is obtainable. In general, such a system ultimately provides a control which still contains a residual phase difference between the two pulse trains, because the measured values of the sawtooth voltage are regulated at a value $V_r$ intermediate between the extreme values of this voltage. This means that in the embodiment shown there is a residual constant phase error $T_1$. In the embodiment shown in FIG. 3, this phase error is avoided by applying the frame-frequency reference signal $f_{r1}$ to the phase comparison circuit F via a delay element P which introduced a delay $T_2$ such that the reference signal is given the waveform shown in FIG. 4d, the delay $T_2$ being selected to that $T_1 + T_2 = T$. If now regulation is such that the frame pulses read out are again produced at instants at which the sawtooth voltage (FIG. 4e) has a value $V_r$, as is shown in FIG. 4f, it will readily be seen from the figure that the original frame-frequency reference pulse train (FIG. 4a) and the frame pulse train read out (FIG. 4f) are in complete synchronism without any phase error. Consequently, in this system the only phase difference which may occur between the two pulse trains is determined by the quality of the servo control.

Alternatively, the same purpose may be achieved by delaying the frame train $f_{r2}$ read out. However, the delay time then must be equal to the said nominal delay of the control system.

The control arrangement shown thus ensures satisfactory synchronism between the reference signal and the video signals read from the record carrier. It should be noted that the control system does not take account of even and odd frames and of the phase of the burst in a color signal. For this purpose additional devices are required, but these are not significant for the design of the control system and hence are not discussed.

Furthermore, it should be noted that the signal read from the record carrier in general is applied to a variable delay line by means of which the phase error left over by the servo control is compensated for.

What is claimed is:

1. Apparatus for recording and for playing back video signals from a tape-shaped record carrier, comprising a head wheel for recording and playing back the video signals, means for measuring the rotational velocity of the head wheel, means for receiving a first vertical synchronization signal, first detector means connected to said velocity measuring means and to said vertical synchronization signal for providing a first control signal, means for receiving a second vertical synchronization signal read from said tape during play back, phase measuring means for providing an output signal corresponding to the phase difference between two input signals, means for connecting the first vertical synchronization signal to one of the two inputs of said phase measuring means, means connecting the second input of the phase measuring means to the rotational velocity measuring means during recording and to said means for receiving said second vertical synchronization signals during playback, a signal controlled oscillator connected to said phase measuring means for providing horizontal reference signals having a frequency controlled by the output of said phase measuring means, terminal means for providing horizontal synchronization signals read from said tape during playback and for providing horizontal synchronization signals derived from said velocity measuring means during recording, a second detector means connected to said terminal means and to said signal controlled oscillator for providing a second control signal, means for controlling the velocity of said head wheel, and switch means responsive during recording to a second control signal of said first detector means for selectively connecting said first control signal or said second control signal to said velocity controlling means.

2. Apparatus as claimed in claim 1, wherein said rotational velocity measuring means comprises a generator which is coupled to the head wheel and supplies a signal the frequency of which is proportional to the speed of the head wheel.

3. Apparatus as claimed in claim 1, wherein said means for connecting said second vertical synchronization signal to said phase measuring means comprises a delay element.

4. Apparatus for recording and for playing back video signals from a tape-shaped record carrier, comprising a head wheel for recording and playing back the video signals, means for measuring the rotational velocity of the head wheel, means for receiving a first vertical synchronization signal, first detector means connected to said velocity measuring means and to said first vertical synchronization signal for providing a first control signal, means for receiving a second vertical synchronization signal read from said tape during play back, phase measuring means for providing an output signal corresponding to the phase difference between two input signals, means for connecting the first vertical synchronization signal to one of the two inputs of said phase measuring means, means connecting the second input of the phase measuring means to the rotational velocity measuring means during recording and to said means for receiving said second vertical synchronization signals during playback, a signal controlled oscillator connected to said phase measuring means for providing horizontal reference signals having a frequency controlled by the output of said phase measuring means, terminal means for providing horizontal synchronization signals read from said tape during play back and for providing horizontal synchronization signals derived from said velocity measuring means during recording, a second detector means connected to said terminal means and to said signal controlled oscillator for providing a second control signal, means for controlling the velocity of said head wheel, a third detector means connected to said means for receiving said first vertical synchronization signal and to said second vertical synchronization signals read from said tape for providing a third control signal and switch means responsive to said third control signal of said third detector and to a second control signal of said first detector for connecting said first control signal or said second control signal to said velocity controlling means.

5. Apparatus for recording and for playing back video signals from a tape-shaped record carrier, comprising a head wheel for recording and playing back the video signals, means for measuring the rotational velocity of the head wheel, means for receiving a first vertical synchronization signal, means for receiving a second vertical synchronization signal read from said tape during play back, first detector means connected to said vertical synchronization signal and connected to said velocity measuring means for providing a first control signal, phase measuring means for providing an output signal corresponding to the phase difference between two input signals, means for connecting the first vertical synchronization signal to one of the two inputs of said phase measuring means, means connecting the second input of the phase measuring means to the rotational velocity measuring means during recording and to said means for receiving said second vertical sycnhronization signals during playback, a signal controlled oscillator connected to said phase measuring means for providing horizontal reference signals having a frequency controlled by the output of said phase measuring means, terminal means for providing horizontal synchronization signals read from said tape during play back and for providing horizontal synchronization signals derived from said velocity measuring means during recording, a second detector means connected to said terminal means and to said signal controlled oscillator for providing a second control signal, means for controlling the velocity of said head wheel, and switch means responsive to a second control signal of said first for selectively connecting said first control signal or said second control signal to said velocity controlling means.

6. Apparatus for recording and for playing back video signals from a tape-shaped record carrier, comprising a head wheel for recording and playing back the video signals, means for measuring the rotational velocity of the head wheel, means for receiving a first vertical synchronization signal, detector means, means for receiving a second vertical synchronization signal read from said tape during playback, first detector means connected to said first vertical synchronization signal and connected to said velocity measuring means for providing a first control signal, phase measuring means for providing an output signal corresponding to the phase difference between two input signals, a delay device for connecting the first vertical synchronization signal to one of the two inputs of said phase measuring means, means connecting the second input of the phase measuring means to the rotational velocity measuring means during recording and to said means for receiving said second vertical synchronization signals during playback, a signal controlled oscillator connected to said phase measuring means for providing horizontal reference signals having a frequency controlled by the output of said phase measuring means, terminal means for providing horizontal synchronization signals read from said tape during play back and for providing horizontal synchronization signals derived from said velocity measuring means during recording, a second detector means connected to said terminal means and to said signal controlled oscillator for providing a second control signal, means for controlling the velocity of said head wheel, a third detector means connected to said means for receiving said first vertical synchronization signal and to said second vertical synchronization signals read from said tape for providing a third control signal, and switch means responsive to said third control signal of said third detector and to a second control signal of said first detector for connecting said first control signal or said second signal to said velocity controlling means.

* * * * *

UNITED STATES PATENT AND TRADEMARK OFFICE
CERTIFICATE OF CORRECTION

PATENT NO. : 4,001,886
DATED : January 4, 1977
INVENTOR(S) : ANTONIUS ISIDORUS HOFSTE OP BRUININK It is certified that error appears in the above-identified patent and that said Letters Patent are hereby corrected as shown below:

Col. 2, line 7, "it" should be --if--;

Col. 3, line 32, "turning" should be --during--;

line 39, "$f_{r2}$" should be --$f_{r1}$--;

Claim 6, line 6, cancel "detector means,";

line 38, after "second" should be --control--;

Signed and Sealed this

Tenth Day of May 1977

[SEAL]

Attest:

RUTH C. MASON
Attesting Officer

C. MARSHALL DANN
Commissioner of Patents and Trademarks